United States Patent [19]
Hurwitz

[11] 3,709,029
[45] Jan. 9, 1973

[54] ULTRASONIC INSPECTION APPARATUS
[75] Inventor: Michael J. Hurwitz, Pittsburgh, Pa.
[73] Assignee: Westinghouse Electric Corporation, Pittsburgh, Pa.
[22] Filed: Dec. 17, 1969
[21] Appl. No.: 885,813

[52] U.S. Cl. .............................73/67.8 R, 73/71.5 U
[51] Int. Cl. ............................................G01n 29/04
[58] Field of Search............73/67.5, 67.7, 67.8, 71.5

[56] References Cited

UNITED STATES PATENTS

| | | | |
|---|---|---|---|
| 3,140,600 | 7/1964 | Howry | 73/67.7 |
| 3,233,449 | 2/1966 | Harmon | 73/67.8 |
| 3,402,598 | 9/1968 | Colgate | 73/67.8 |
| 3,496,764 | 2/1970 | Stouffer | 73/67.8 |
| 3,325,781 | 6/1967 | Harris | 73/67.7 X |

*Primary Examiner*—Richard C. Queisser
*Assistant Examiner*—Arthur E. Korkosz
*Attorney*—A. T. Stratton, Z. L. Dermer and M. B. L. Hepps

[57] ABSTRACT

A multiple transducer probe for pulse-echo ultrasonic testing, and especially for image-forming at depth within objects, comprising a transducer system focused along a line and having its component transducers situated along an arc of a circle. Separate transmitting and receiving transducers are preferably mounted covering end-to-end quadrants of a conical depression machined in a metallic transducer block. The transducer block is, in turn, mounted for movement on a coupling block having one surface shaped to fit a surface of the object to be tested.

8 Claims, 2 Drawing Figures

PATENTED JAN 9 1973
3,709,029
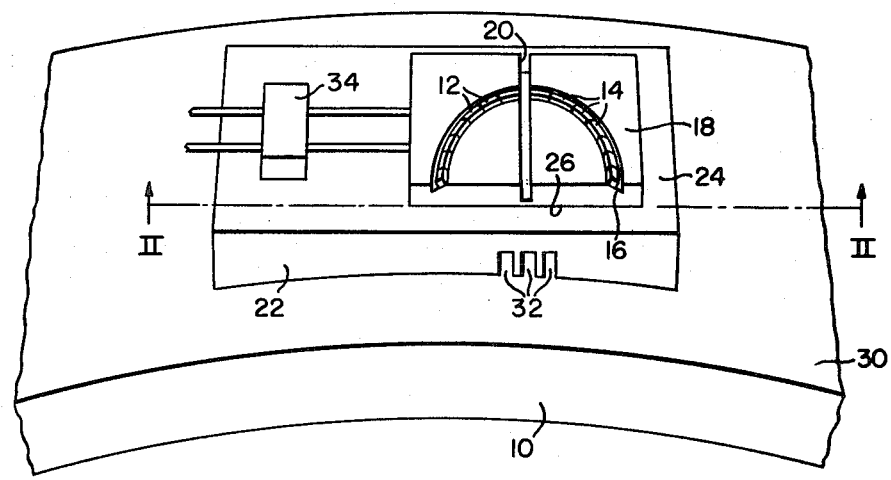
FIG. I.
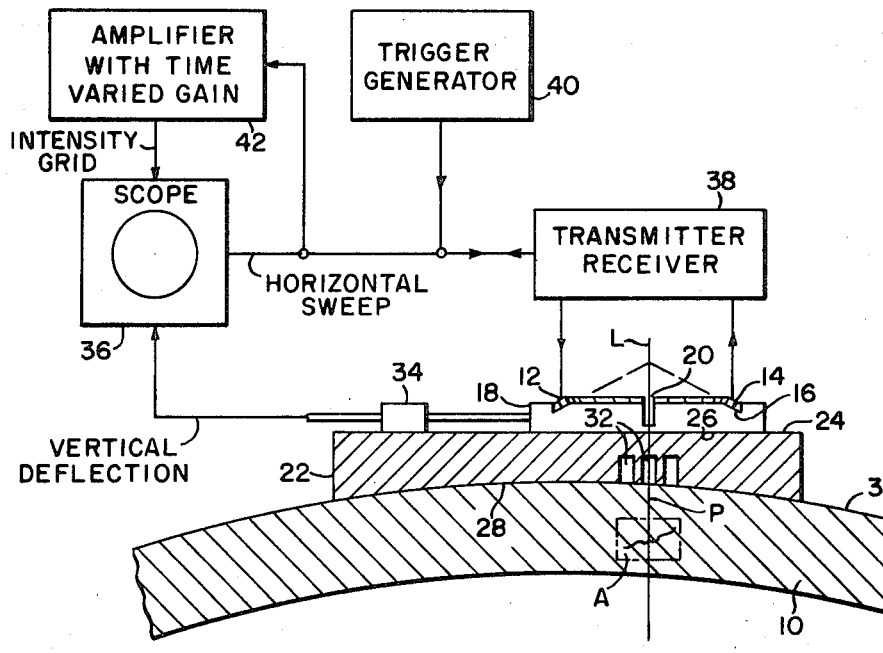
FIG. 2.
WITNESSES
Edwin E. Bassler
James F. Young
INVENTOR
Michael J. Hurwitz
BY M.B.L. Hporre
ATTORNEY

ULTRASONIC INSPECTION APAPRATUS

BACKGROUND OF THE INVENTION

This invention concerns focused electro-acoustic transducer probes, and more particularly, multiple transducer line focusing probes for image-forming at depth within objects.

In order to accurately characterize flaws in large metal castings, or to view objects within liquids; such as fuel assemblies within a liquid sodium cooled reactor, or for medical diagnosis purposes, it is desirable to form sonic pictures at a depth within an object of high resolution. Present ultrasonic techniques are not well suited to perform this function.

Heretofore, a preferable ultrasonic testing probe might comprise two transducer probes, one transmitting and one receiving, situated along the arc of a circle and focused upon a point at a chosen depth within the object to be inspected. Such a system can be characterized such that the plane of the circle in which the transducers lie is perpendicular to the chosen plane of inspection, i.e., the latter plane being that plane in which the focal points would lie should the probe being moved over a planar surface of the object which is parallel to that chosen plane of inspection. The transducers are generally acoustically coupled to the test object through a solid coupling means which is shaped to fit the transducers on one side and is flat on the other side.

A major deficiency of point focused probes exists in that in such a probe the transducer's plane of focus is fixed at a fixed depth with the object of inspection by (1) the size of the chosen radius of curvature and (2) the depth of the coupling means to the surface on the object upon which the coupling means is mounted. To inspect a plane of the object which covers a plurality of depths, a large number of probes would be needed.

Another deficiency of the above described systems exists in that the coupling means is flat on the side opposite the transducers. Where the object to be tested is not flat, the variable gap at the interface of the coupling means and the test object causes major degradations in test results. The transducer sensitivity and signal to noise ratio of echoes from flaws is reduced. A single flaw might return a train of echoes. Sound echoing in the coupling means may inundate valid returns. In addition, this causes the beam pattern to be radically changed.

SUMMARY OF THE INVENTION

The above enumerated deficiencies of prior art systems are minimized in accordance with this invention by arranging a plurality of transducers along the arc of a circle; the transducers being focused along a line perpendicular to the plane of the transducers. In addition the transducers may in certain applications be acoustically coupled to the test object through a coupling clock having one surface shaped to fit the test object.

In other applications, such as the viewing or inspection of objects immersed in liquid, a separate coupling block is not employed, but rather the liquid serves as the coupling means. For example, for viewing or inspecting objects in liquid metal such as liquid sodium, the liquid metal serves as the coupling means.

The transmitting transducers cover one quadrant of a circle and the receiving transducers occupy an adjacent quadrant. The pulses generated form individual beams and reinforce each other along a line perpendicular to the chosen circle and passing through its center. The beams interfere at other regions and especially adjacent the line. As will be understood, proper choice of an acoustic window and frequency can produce high resolution with such an arrangement. Further, the points along the focus line are distinguishable by their time of arrival; as is known in the art.

A line of focus is desirable to achieve images from areas remote from the transducer. The line of focus is through the object rather than at a chosen depth. Translation of the transducer probe can then produce an image of a multiple-depth area under investigation.

The transducer block is carefully machined to fit the coupling block. The coupling block is, in turn, carefully machined, with an arcuate surface if necessary, to fit the workpiece. Such an arrangement, with the usual grease or other coupling medium, increases the clarity of echoes. Moreover, the transducer block can be moved either manually or by a simple x-y translation mechanism over the surface of the coupling block to form images.

DESCRIPTION OF THE DRAWINGS

For a better understanding of the invention reference may be had to the accompanying drawing, depicting an exemplary embodiment of the invention, in which:

FIG. 1 is an isometric view of an ultrasonic test structure in accordance with this invention; and FIG. 2 is a sectional view along the lines II—II of the test structure of FIG. 1 and shows schematically cooperating signal generating means.

DESCRIPTION OF THE PREFERRED EMBODIMENTS

Referring to FIGS. 1 and 2 there is shown an ultrasonic inspection apparatus mounted on a workpiece 10. A plurality of ultrasonic transducers preferably including transmitting transducers 12 and receiving transducers 14 are fixedly mounted in a depression 16 in a metallic block 18. Although a plurality of separate transmitting transducers 14 and receiving transducers 16 are shown, one or more transducers which both transmit and receive, if occupying substantially an arc of a circle, would also suffice. The depression 16 may be a machined recess in the block and is in the shape of an arc of a circle in plan view. The metallic block 18 also preferably includes a decoupling groove 20 extending at least along a radius of the circle between adjacent quadrants thereof. The decoupling groove 20 functions to isolate reverberations from the transmitter transducers 12 to the reception transducers 14.

The transducer block 18 is acoustically coupled to the workpiece 10 through a coupling means such as member 22. The upper surface 24 of the coupling means 22 is carefully machined to fit the lower surface 26 of the transducer block 18. In accordance with this embodiment, the lower surface 28 of the coupling means 22 is carefully machined to fit the upper surface 30 of the workpiece 10. The coupling means 22 also preferably includes a plurality of decoupling grooves 32 located *beneath* decoupling groove 20 and parallel thereto which function in a similar manner to groove 20 so as to decouple reverberations between the transmitter transducers 12 and the receiving transducers 14.

The transducer block 18 is preferably mounted for translation along the coupling means 22. A simple x-y translation motor 34 of a construction well known in the art may be used for this purpose.

As previously explained the transmitting transducers 12 and the receiving transducers 14 are located on adjacent quadrants of a circle. The transducers are so energized that when they are excited they radiate a short pulse of sound in all directions. With reference particularly to FIG. 2, it can be seen that the sound pulses will reach any point P along a line L located perpendicular to the plane of the transducers and through the center of the circle, which is chosen for their location, at equal time intervals. That is, the sound pulses from all the transducers will arrive at point P simultaneously and will reinforce one another. The sound energy may thus be said to be focused. Since receivers occupy an adjacent quadrant of the same circle, they are also focused. Thus the sound generated by the transmitting transducers 12 will simultaneously reach a point P and any echoes therefrom will simultaneously reach the receiving transducers 14. Sound from a source not on the line L on which points P are located will travel different distances to the different receiving transducers 14 and will arrive at different times so that the electrical signals will not reinforce. If the transmitting and receiving transducers 12 and 14, respectively, are electrically connected together, the signals therefrom will reinforce each other. As should be clear although the transmitting transducers and the receiving transducers 14 have been shown to occupy adjacent quadrants of the circle they may occupy adjacent semicircles or lesser arcs of a circle depending upon the energy requirements and other known factors.

The output of the transducers 14 may be displayed in the usual well known manner. A preferable oscilloscope 36 is that now known by the trade name Tekronics 545. Briefly the transducers 12 are energized from a transmitter-receiver 38 which also receives the signals from the transducers 14. The ultrasonic pulses are generated to the transmitter receiver by a trigger generator 40. The output of the transducers 14 suitably characterized may form the horizontal sweep for the scope 36. The output may also be sent to an amplifier 42 which has a time varied gain to form the input to the intensity grid of the oscilloscope 36. In order to investigate an area A at some depth within the workpiece 10 the transducer block 18 may be moved across the area with the movement forming the vertical deflection on the scope 36. Thus an image of a flaw within the area A would show up on the scope in much the same manner as television pictures are now generated.

The transducers 12 and 14 which are preferably of lead metaniobate piezoelectric ceramic material are preferably made with cylindrical generating faces so as to facilitate focusing along a line. The transducers 12 and 14 may also be mounted at an angle so as to provide maximum sound pressure at a particular depth within the test object or workpiece 10. When it is desired that the transducers 12 and 14 be mounted at an angle, the depression 16 is machined so that the transducers are seated upon a conical section formed by the machinery of the circular depression with an angled inner face. Although some variation in the width of the beam and the angle of focus is possible, it is critical that the transducers 12 and 14 be mounted on a circle and be focused along a line perpendicular to the plane of the circle. The transducers 12 and 14 are also preferably narrow, i.e., the thickness 't' in FIG. 1 should be a fraction or at most a small multiple of the wavelength of the ultrasonic energy to be generated by the transducer. Narrow transducers 12 and 14 are necessary in order to generate vibrations of sufficient amplitude along substantial line of focus. A wide transducer would cause beams from its front and back edges to interfere in certain regions along the focal line.

Although the test structure depicted is particularly adapted to the display of flaws within a metallic block it may also be used for forming images under liquid sodium in a nuclear reactor. In this case the transducer arcs is directly immersed in the liquid metal and the axis of focus is scanned either linearly or angularly to form sonic pictures of objects in the liquid metal. Similarly the ultrasonic inspection apparatus of this invention could be used for medical diagnostic purposes to form images of organs within the human body.

The coupling means 22 is mounted on the workpiece 10 preferably through a coupling medium such as grease or thermoplastic cement; as is known in the art. As previously indicated the lowest surface 28 of the coupling means 22 is preferably shaped to closely fit the upper surface 30 of the workpiece 10. The layer of grease or other coupling medium should be as thin and uniform as possible. If there is a nonuniformity in the thickness of the coupling layer, the separate transducers 12 and 14 would have different amplitudes and if the thicknesses vary over a range in 2 to 1 the beam pattern will be seriously degraded.

It should now be apparent that an ultrasonic inspection apparatus has been described which is uniquely adapted to image forming at a depth within a test object, a liquid pool or even the human body. As there will be understood by the worker in the art the fine focused ultrasonic testing device of this invention is operative with a wide range of frequencies, aperture diameters and wavelengths. By way of specific example, in order to detect flaws as small as one-sixteenth of an inch at a 12 inch depth in a thick steel block one might choose a frequency of 8 MHZ with an aperture diameter of 5.5 inches and a wavelength of 0.029. The approximate length of the transducer transmitting quadrant arc, in this example, would then be approximately 8.7 inches.

I claim:

1. An ultrasonic inspection apparatus comprising
means for generating pulses of sonic energy;
means for displaying variations in reflected sonic energy; and
at least one transducer, said transducer being connected to said generating means, and said transducer being connected to said display means, said transducer occupying a portion of an arc of a circle and focused along a narrow line perpendicular to the plane of said circle through its center, and perpendicular to the surface of the test object to which the inspection apparatus is coupled.

2. The apparatus of claim 1 including a plurality of transducers, a first portion of the transducers being connected to said generating means for generating acoustical pulses of energy, and a second portion of the transducers being connected to the display means.

3. The apparatus of claim 2 where the first portion occupies a quadrant of the circle and the second portion occupies an adjacent quadrant, said first portion being electrically connected to each other and said second portion being electrically connected to each other.

4. The apparatus of claim 3 including a metallic block having an acoustic decoupling means situated in at least one surface thereof, said transducers being mounted on said surface.

5. The apparatus of claim 4 including a coupling means, the metallic block situated on one surface of said coupling means, and the other surface of said coupling means being shaped to fit a surface of the object to be tested.

6. The apparatus of claim 5 including means or producing translational movement of said metallic block, said means being mounted on said coupling means.

7. An ultrasonic probe comprising:
- a plurality of transmitting transducers mounted on an arc of a circle and electrically commonly connected;
- a plurality of receiving transducers mounted on an adjacent arc of said circle and electrically commonly connected;
- said transducers being constructed to focus on a line perpendicular to said circle through its center, and perpendicular to the surface of the test object to which the probe is coupled.

8. The ultrasonic probe of claim 7 wherein both the transmitting transducers and the receiving transducers are mounted such that lines perpendicular to their generating and receiving surfaces, respectively, meet at a point within the object to be tested.

* * * * *